US012609594B2

(12) United States Patent
Sakai et al.

(10) Patent No.: US 12,609,594 B2
(45) Date of Patent: Apr. 21, 2026

(54) MAGNETIC GEARED ELECTRICAL MACHINE, POWER GENERATION SYSTEM, AND DRIVE SYSTEM

(71) Applicant: MITSUBISHI HEAVY INDUSTRIES, LTD., Tokyo (JP)

(72) Inventors: Masayuki Sakai, Tokyo (JP); Yasutaka Aoki, Tokyo (JP); Akihiko Umeda, Tokyo (JP); Atsushi Yuge, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 241 days.

(21) Appl. No.: 18/562,717

(22) PCT Filed: Jun. 14, 2022

(86) PCT No.: PCT/JP2022/023732
§ 371 (c)(1),
(2) Date: Nov. 20, 2023

(87) PCT Pub. No.: WO2023/007969
PCT Pub. Date: Feb. 2, 2023

(65) Prior Publication Data
US 2024/0146161 A1 May 2, 2024

(30) Foreign Application Priority Data

Jul. 27, 2021 (JP) ................................. 2021-122736

(51) Int. Cl.
*H02K 16/02* (2006.01)
*H02K 1/2706* (2022.01)
(Continued)

(52) U.S. Cl.
CPC ........... *H02K 16/02* (2013.01); *H02K 1/2706* (2013.01); *H02K 5/207* (2021.01); *H02K 7/083* (2013.01);
(Continued)

(58) Field of Classification Search
CPC ...... H02K 49/102; H02K 51/00; H02K 16/02; H02K 9/06; H02K 9/08; H02K 1/32; H02K 7/1807; H02K 7/183
(Continued)

(56) References Cited

U.S. PATENT DOCUMENTS 5,895,994 A * 4/1999 Molnar .................... H02K 3/50
310/410
6,144,130 A * 11/2000 Kawamura ............ H02K 1/278
310/264

(Continued)

FOREIGN PATENT DOCUMENTS

CN 201699555 U * 1/2011 ............. H02K 16/02
DE 102007006856 A1 * 8/2008 ............. H02K 5/203
(Continued)

OTHER PUBLICATIONS

International Search Report (PCT/ISA/210) issued in PCT/JP2022/023732, dated Sep. 6, 2022.
(Continued)

*Primary Examiner* — Oluseye Iwarere
*Assistant Examiner* — Daniel K Schlak
(74) *Attorney, Agent, or Firm* — Birch, Stewart, Kolasch & Birch, LLP

(57) ABSTRACT

A magnetic geared electrical machine includes: a stator; a magnetic pole piece rotor including a plurality of magnetic pole pieces disposed radially inward of the stator; an inner rotor including a plurality of rotor magnets, disposed radially inward of the plurality of magnetic pole pieces, and configured to rotate at a higher speed than the magnetic pole piece rotor; and a fan for cooling at least one of the stator, the magnetic pole piece rotor, or the inner rotor. The magnetic pole piece rotor further includes a power transmission shaft disposed on one side in an axial direction
(Continued)

One side ◄————► Other side
Axial direction relative to the plurality of magnetic pole pieces, and configured to transmit rotational power to and from an external device. The fan is attached to the inner rotor on an opposite side to the power transmission shaft with the rotor magnet therebetween in the axial direction.

18 Claims, 5 Drawing Sheets

(51) Int. Cl.

| | |
|---|---|
| H02K 1/32 | (2006.01) |
| H02K 5/20 | (2006.01) |
| H02K 7/08 | (2006.01) |
| H02K 7/18 | (2006.01) |
| H02K 9/06 | (2006.01) |
| H02K 9/08 | (2006.01) |
| H02K 49/10 | (2006.01) |
| H02K 51/00 | (2006.01) |

(52) U.S. Cl.
CPC ............. *H02K 7/1807* (2013.01); *H02K 9/06* (2013.01); *H02K 49/102* (2013.01); *H02K 1/32* (2013.01); *H02K 7/183* (2013.01); *H02K 9/08* (2013.01); *H02K 51/00* (2013.01); *Y02E 10/72* (2013.01)

(58) Field of Classification Search
USPC .......................................................... 310/62
See application file for complete search history.

(56) References Cited

U.S. PATENT DOCUMENTS

| | | | | |
|---|---|---|---|---|
| 2004/0108781 A1* | 6/2004 | Razzell | ................. | H02K 51/00 |
| | | | | 310/112 |
| 2004/0150270 A1* | 8/2004 | Nagayama | ............. | H02K 5/207 |
| | | | | 310/59 |
| 2006/0055254 A1* | 3/2006 | Pellegrino | .............. | H02K 17/16 |
| | | | | 310/58 |
| 2006/0226717 A1* | 10/2006 | Nagayama | ............... | H02K 9/06 |
| | | | | 310/58 |
| 2007/0186692 A1* | 8/2007 | Waszak | ................... | H02K 1/16 |
| | | | | 73/862.331 |
| 2010/0079016 A1* | 4/2010 | Hemmelmann | ....... | H02K 9/227 |
| | | | | 310/54 |

| | | | | |
|---|---|---|---|---|
| 2011/0012458 A1* | 1/2011 | Atallah | .................. | H02K 51/00 |
| | | | | 310/103 |
| 2011/0042965 A1* | 2/2011 | Atallah | .................. | H02K 51/00 |
| | | | | 290/44 |
| 2011/0285132 A1* | 11/2011 | Waszak | .................... | H02K 7/11 |
| | | | | 290/52 |
| 2013/0292941 A1* | 11/2013 | Mountain | ................ | H02P 9/14 |
| | | | | 310/46 |
| 2014/0091680 A1* | 4/2014 | Kaneko | ................. | F16C 35/042 |
| | | | | 310/60 R |
| 2014/0333163 A1* | 11/2014 | Horii | ........................ | H02K 9/10 |
| | | | | 310/59 |
| 2016/0079814 A1* | 3/2016 | Lacroix | .................... | H02K 9/06 |
| | | | | 310/156.53 |
| 2016/0087517 A1* | 3/2016 | Powell | ................. | H02K 7/1823 |
| | | | | 310/103 |
| 2016/0126875 A1* | 5/2016 | Bouheraoua | ........... | H02P 17/00 |
| | | | | 318/400.37 |
| 2017/0005545 A1* | 1/2017 | Kaneko | .................... | H02K 9/10 |
| 2017/0005559 A1* | 1/2017 | Hawksworth | ......... | H02K 15/03 |
| 2017/0141648 A1* | 5/2017 | Chong | .................. | H02K 41/02 |
| 2017/0373582 A1* | 12/2017 | Hawksworth | ........ | H02K 49/102 |
| 2019/0052157 A1* | 2/2019 | Makino | .................... | H02K 5/16 |
| 2020/0059133 A1* | 2/2020 | Okubo | .............. | F04D 29/4253 |
| 2020/0112224 A1* | 4/2020 | Okubo | ................ | H02K 5/1732 |
| 2021/0265905 A1* | 8/2021 | Jungmayr | ........... | H02K 5/1732 |
| 2022/0052596 A1* | 2/2022 | Ukaji | ..................... | H02K 7/116 |

FOREIGN PATENT DOCUMENTS

| | | | | | |
|---|---|---|---|---|---|
| DE | 102010063270 A1 * | 6/2012 | ............. | B60L 50/51 |
| EP | 0261295 A1 * | 3/1988 | .............. | H02K 9/06 |
| EP | 3 113 344 A1 | 1/2017 | | |
| EP | 3703227 A1 * | 9/2020 | ............ | H02K 21/14 |
| EP | 3 813 238 A1 | 4/2021 | | |
| JP | 9-46984 A | 2/1997 | | |
| JP | 2860038 B2 | 2/1999 | | |
| KR | 20130049189 A * | 5/2013 | .............. | H02K 9/06 |
| WO | WO 2012/066106 A1 | 5/2012 | | |
| WO | WO 2017/033001 A1 | 3/2017 | | |
| WO | WO 2019/234967 A1 | 12/2019 | | |

OTHER PUBLICATIONS

Extended European Search Report for European Application No. 22849046.2, dated Oct. 1, 2024.

\* cited by examiner

MAGNETIC GEARED ELECTRICAL MACHINE, POWER GENERATION SYSTEM, AND DRIVE SYSTEM

TECHNICAL FIELD

The present disclosure relates to a magnetic geared electrical machine, a power generation system, and a drive system.

This application is the National Phase under 35 U.S.C. § 371 of International Application PCT/JP2022/023732 filed Jun. 14, 2022, which claims the priority of Japanese Patent Application No. 2021-122736 filed on Jul. 27, 2021, the content of which is incorporated herein by reference.

BACKGROUND

Patent Document 1 discloses a rotating electric machine as an induction electric motor that can cool an internal space. This rotating electric machine includes: a stator; a rotor located on an inner diameter side of the stator; and an inner fan and an outer fan respectively disposed at both ends of the rotor in the axial direction. When the rotor outputs rotational power, the inner fan circulates internal air, and the outer fan forms cooling air along an outer surface of a housing.

CITATION LIST

Patent Literature

Patent Document 1: WO201923467A

SUMMARY

Technical Problem

When a magnetic geared rotating machine operates in which a plurality of parts for transmitting rotational power are not in contact with each other, a temperature of an internal space may rise due to, for example, copper loss or iron loss. Therefore, in the magnetic geared rotating machine, a cooling design is desired which can cope with the temperature rise in the internal space. However, Patent Document 1 does not disclose the configuration for cooling the internal space of the magnetic geared rotating machine.

The object of the present disclosure is to provide a magnetic geared rotating machine, a power generation system, and a drive system which are capable of sufficiently exhibiting cooling performance.

Solution to Problem

A magnetic geared electrical machine according to at least one embodiment of the present disclosure, includes: a stator; a magnetic pole piece rotor including a plurality of magnetic pole pieces disposed radially inward of the stator; an inner rotor including a plurality of rotor magnets, disposed radially inward of the plurality of magnetic pole pieces, and configured to rotate at a higher speed than the magnetic pole piece rotor; and a fan for cooling at least one of the stator, the magnetic pole piece rotor, or the inner rotor. The magnetic pole piece rotor further includes a power transmission shaft disposed on one side in an axial direction relative to the plurality of magnetic pole pieces, and configured to transmit rotational power to and from an external device. The fan is attached to the inner rotor on an opposite side to the power transmission shaft with the rotor magnet therebetween in the axial direction.

A power generation system according to at least one embodiment of the present disclosure, includes: the above-described magnetic geared rotating machine which serves as a magnetic geared generator configured to generate electric power upon input of rotational power; and the external device which serves as a prime mover including a shaft connected to the power transmission shaft configured such that rotational power is input thereto.

A drive system according to at least one embodiment of the present disclosure, includes: the above-described magnetic geared rotating machine which serves as a magnetic geared motor configured to output rotational power; and the external device which serves as a drive part including a shaft connected to the power transmission shaft configured to output rotational power.

Advantageous Effects

According to the present disclosure, it is possible to provide a magnetic geared rotating machine, a power generation system, and a drive system which are capable of sufficiently exhibiting cooling performance.

DETAILED DESCRIPTION

Figures 1A, 1B:
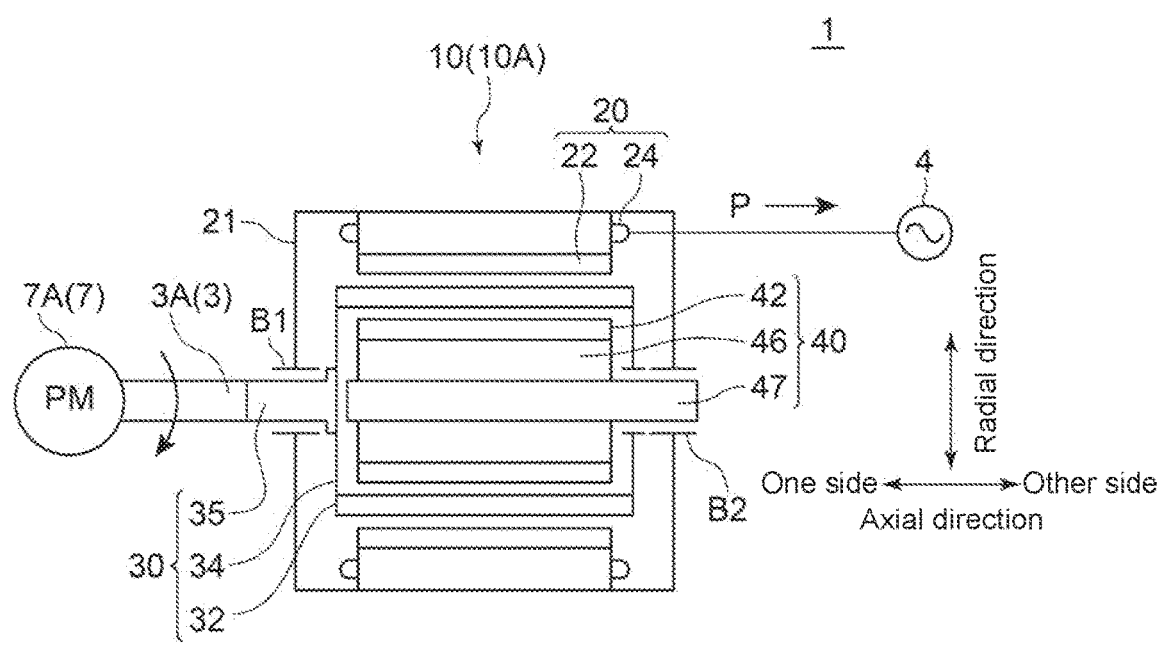
FIG. 1A is a schematic view showing an example of a magnetic geared electrical machine.
FIG. 1B is a schematic view showing another example of the magnetic geared electrical machine.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

(Overview of Magnetic Geared Electrical Machine)

FIGS. 1A and 1B are each a schematic view showing an example of a magnetic geared electrical machine. Herein, in FIGS. 1A and 1B, the "axial direction" is a direction parallel to a rotational shaft 47 of a magnetic geared electrical machine 10, and the "radial direction" is a direction orthogonal to the rotational shaft 47. Rotational power is transmitted between the magnetic geared electrical machine 10 and an external device 7.

In an embodiment, as shown in FIG. 1A, the magnetic geared electrical machine 10 is a magnetic geared generator 10A configured to generate electric power by rotational power transmitted (input) from an external device 7A (7) serving as a prime mover, and configured to supply electric power P generated by the power generation to a power supply destination 4 which may be, for example, a power grid.

In another embodiment, as shown in FIG. 1B, the magnetic geared electrical machine 10 is a magnetic geared motor 10B configured to transmit (output) rotational power to an external device 7B (7) serving as a drive part, upon receiving the electric power P supplied from a power supply source 6 which may be, for example, a power grid.

In the embodiment shown in FIG. 1A, the magnetic geared generator 10A constitutes part of a power generation system 1. The power generation system 1 may be, for example, a renewable energy power generation system such as a wind power generation system or a tidal current power generation system. If the power generation system 1 is the wind power generation system, a shaft 3A (3) included in the external device 7A as the prime mover is a wind turbine rotor.

The magnetic geared generator 10A includes a stator 20 including a stator magnet 22 and a stator coil 24, a magnetic pole piece rotor 30 including a plurality of magnetic pole pieces 32 disposed radially inward of the stator 20, and an inner rotor 40 including a plurality of rotor magnets 42. The inner rotor 40 is disposed radially inward of the plurality of magnetic pole pieces 32 and is configured to rotate at a higher speed than the magnetic pole piece rotor 30. In the example shown in FIG. 1A, the stator 20 is disposed inside a housing 21. The magnetic pole piece rotor 30 includes a pair of end plates 34 respectively disposed at both ends of the plurality of magnetic pole pieces 32 in the axial direction, and a power transmission shaft 35 for transmitting rotational power to and from the external device 7A. The power transmission shaft 35 of the present example is connected to the shaft 3A of the external device 7A, and is also connected to the end plate 34 located on one side in the axial direction. The power transmission shaft 35 is rotatably supported by the housing 21 via a bearing B1. As rotational power is transmitted (input) from the shaft 3A of the external device 7A to the power transmission shaft 35, the magnetic pole piece rotor 30 rotates integrally with the shaft 3A.

The inner rotor 40 includes a core 46 provided with the plurality of rotor magnets 42, and a rotational shaft 47 extending axially on the radially inner side of the core 46. The rotational shaft 47 is rotatably supported by the housing 21 via a bearing B2.

The above-described magnetic geared generator 10A has a structure in which a magnetic gear and a generator are integrated. The magnetic geared generator 10A is configured to convert a mechanical input from the external device 7A into electric power by utilizing a harmonic type magnetic gear principle and electromagnetic induction.

For example, power generation in the magnetic geared generator 10A may be performed according to the following principle. A magnetic flux of the stator magnet 22 is modulated by the magnetic pole piece 32 of the magnetic pole piece rotor 30 rotating together with the shaft 3A of the external device 7A, and the rotor magnet 42 receives a magnetic force from the modulated magnetic field, thereby rotating the inner rotor 40. At this time, the ratio (speed increasing ratio) of the rotation speed of the inner rotor 40 to the magnetic pole piece rotor 30 is expressed by a ratio of the number of magnetic poles NL of the magnetic pole piece 32 to the number of pole pairs NH of the rotor magnet 42 (=NL/NH). When the inner rotor 40 rotates, an electric current is generated in the stator coil 24 by electromagnetic induction. The number of magnetic poles NL of the magnetic pole piece 32 is greater than the number of pole pairs NH of the rotor magnet 42. Further, the number of magnetic poles NL of the magnetic pole piece 32 is greater than the number of pole pairs NS of the stator magnet 22.

In the embodiment shown in FIG. 1B, the magnetic geared motor 10B constitutes part of a drive system 2. The drive system 2 operates by using the magnetic geared motor 10B as a drive source. As an example, the drive system 2 may be a vehicle running by using the magnetic geared motor 10B as a rotational power source, and in this case, a shaft 3B (3) of an external device 7B is a drive shaft for transmitting rotational power to wheels.

The basic configuration of the magnetic geared motor 10B is common to the magnetic geared generator 10A shown in FIG. 1A.

That is, the magnetic geared motor 10B includes the stator 20 including the stator magnet 22 and the stator coil 24, the magnetic pole piece rotor 30 including the plurality of magnetic pole pieces 32, and the inner rotor 40 including the plurality of rotor magnets 42. The inner rotor 40 is disposed radially inward of the plurality of magnetic pole pieces 32 and is configured to rotate at a higher speed than the magnetic pole piece rotor 30. In the example shown in FIG. 1B, the stator 20 is disposed inside the housing 21. The magnetic pole piece rotor 30 includes the pair of end plates 34 respectively disposed at the both ends of the plurality of magnetic pole pieces 32 in the axial direction, and the power transmission shaft 35 for transmitting rotational power to and from the external device 7B. The power transmission shaft 35 of the present example is connected to the shaft 3B of the external device 7B, and is also connected to the end plate 34 located on the one side in the axial direction. The power transmission shaft 35 is rotatably supported by the housing 21 via the bearing B1. The rotational power generated in the magnetic geared motor 10B is transmitted (output) from the power transmission shaft 35 to the shaft 3B of the external device 7B, thereby rotating the shaft 3B and operating the external device 7B.

The inner rotor 40 includes the core 46 provided with the plurality of rotor magnets 42, and the rotational shaft 47 extending axially on the radially inner side of the core 46. The rotational shaft 47 is rotatably supported by the housing 21 via the bearing B2.

The magnetic geared motor 10B has a structure in which the magnetic gear and a motor are integrated. The magnetic geared motor 10B rotates the inner rotor 40 by a rotating magnetic field generated by energization of the stator coil 24. Rotational power transmission from the inner rotor 40 to the magnetic pole piece rotor 30 utilizes the principle of a harmonic magnetic gear.

(Internal Structure of Magnetic Geared Electrical Machine)

Subsequently, an internal structure of the above-described magnetic geared electrical machine 10 (10A, 10B) will be described with reference to FIG. 2.

Figure 2:
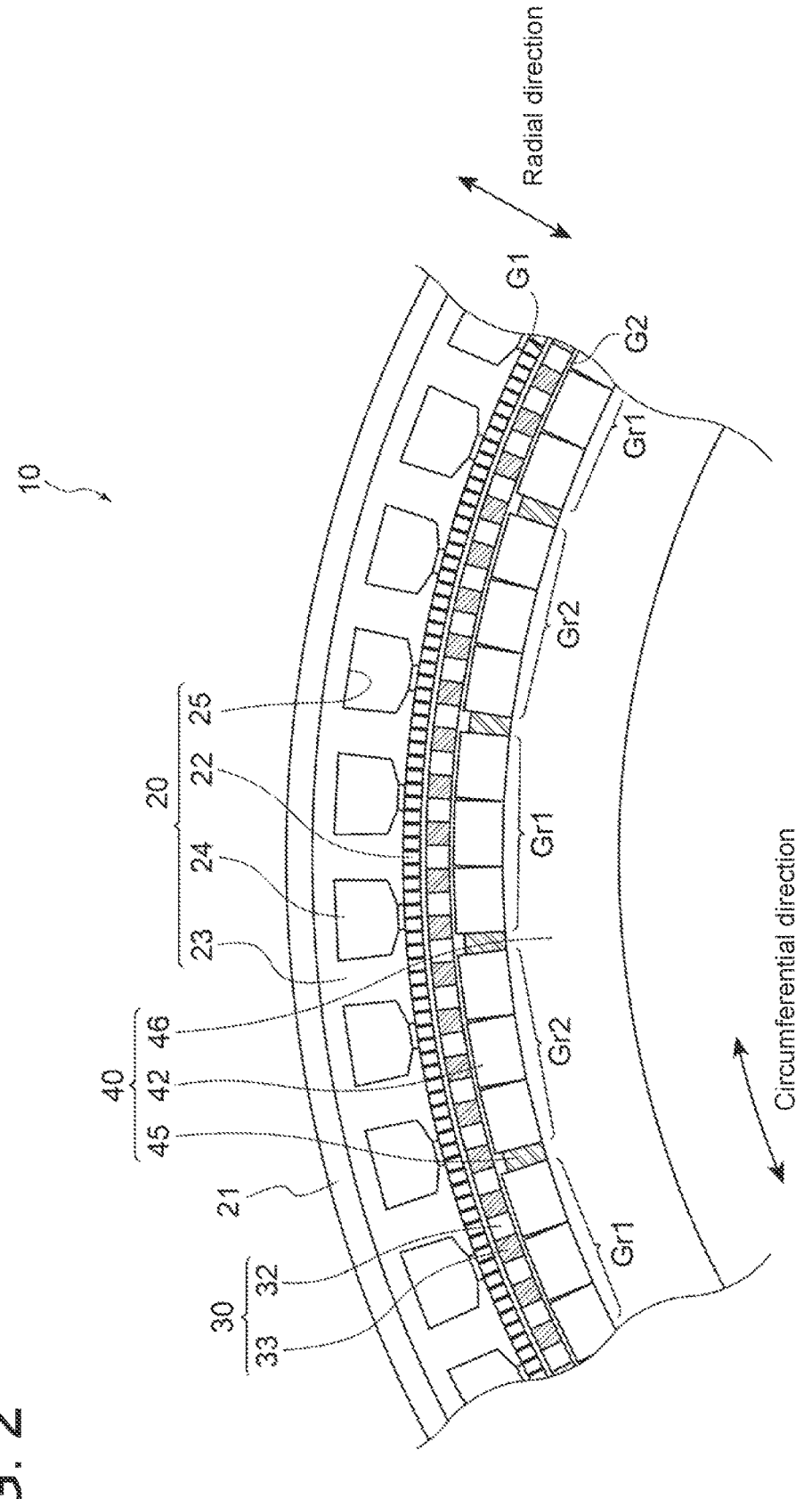
FIG. 2 is a radial cross-sectional view of the magnetic geared electrical machine according to an embodiment.

FIG. 2 is a radial cross-sectional view of the magnetic geared electrical machine 10 according to an embodiment. In FIG. 2, the "circumferential direction" is the circumferential direction based on the axial direction of the magnetic geared electrical machine 10.

As shown in FIG. 2, the stator 20 of the magnetic geared electrical machine 10 includes the plurality of stator magnets 22 and the stator coils 24 arranged in the circumferential direction. The stator magnets 22 and the stator coils 24 are attached to a stator core 23.

The stator magnets 22 are formed by permanent magnets, and the plurality of stator magnets 22 are disposed in the circumferential direction so as to axially pass between the stator coils 24 and the magnetic pole piece rotor 30 in the radial direction. In the example shown in FIG. 2, each of the stator magnets 22 is an axially elongated rod-shaped member having a rectangular cross section. That is, a dimension of each side of the rectangular cross section of the stator magnet 22 shown in FIG. 2 is sufficiently less than an axial dimension of the stator magnet 22 shown in FIGS. 1A and 1B.

FIG. 2 shows a structural example of a surface permanent magnet (SPM) in which the stator magnets 22 are attached to the surface of the stator core 23. In another embodiment, the stator 20 may have a structure of an interior permanent magnet (IPM) in which the stator magnets 22 are embedded in the stator core 23.

The stator coils 24 are disposed within a plurality of slots 25 disposed in the stator core 23. The plurality of slots 25 are disposed in the circumferential direction, and each of the slots 25 extends in the axial direction. Axial both ends of each of the slots 25 are open, and coil end portions 24A (see FIG. 3) of the stator coil 24 that do not fit into the slot 25 may protrude from the stator core 23 at both ends of the stator core 23 in the axial direction.

The magnetic pole piece rotor 30 which is radially opposed to the stator 20 having the above-described configuration includes the plurality of magnetic pole pieces 32 disposed with a first radial gap G1 between themselves and the stator 20 and arranged in the circumferential direction. Each of the magnetic pole pieces 32 is formed by a magnetic material such as an electrical steel sheet or a powder magnetic core, and is an axially elongated rod-shaped member having the rectangular cross section. That is, a dimension of each side of the rectangular cross section of the magnetic pole piece 32 shown in FIG. 2 is sufficiently less than an axial dimension of the magnetic pole piece 32 shown in FIGS. 1A and 1B.

Besides the magnetic pole pieces 32, the magnetic pole piece rotor 30 may include other members such as a non-magnetic member 33 (see FIG. 2) which is formed by a non-magnetic material and connects the magnetic pole pieces 32 in the circumferential direction, and the end plates 34 described above with reference to FIGS. 1A and 1B.

The non-magnetic member 33 may be a fiber reinforced plastic (FRP) in which reinforcing fibers are combined with a matrix resin and may be, for example, CFRP using carbon fibers as reinforcing fibers or GFRP using glass fibers as reinforcing fibers.

As shown in FIG. 2, the inner rotor 40 is disposed radially inward of the plurality of magnetic pole pieces 32 with a second radial gap G2 therebetween. The first radial gap G1 between the stator 20 and the magnetic pole piece rotor 30 and the second radial gap G2 between the magnetic pole piece rotor 30 and the inner rotor 40 may have substantially the same dimension.

The inner rotor 40 includes the plurality of rotor magnets 42 each of which is formed by a permanent magnet, and the plurality of rotor magnets 42 are arranged in the circumferential direction. Each of the rotor magnets 42 may be an axially elongated rod member having a rectangular cross section.

FIG. 2 shows a structural example of the surface permanent magnet (SPM) in which the rotor magnet 42 is attached to the surface of the core 46. In another embodiment, the inner rotor 40 may have the interior permanent magnet (IPM) structure in which the rotor magnets 42 are embedded in the core 46.

Besides the rotor magnet 42 and the core 46, the inner rotor 40 may include other members such as the rotational shaft 47 described above with reference to FIGS. 1A and 1B and a closure member 45 (see FIG. 2) for filling the circumferential gap between the rotor magnets 42.

Further, the closure member 45 may be a fiber reinforced plastic (FRP) in which reinforcing fibers are combined with a matrix resin and may be, for example, CFRP using carbon fibers as reinforcing fibers or GFRP using glass fibers as reinforcing fibers. As shown in FIG. 2, the closure member 45 may close at least part of the circumferential gap between magnet groups (Gr1, Gr2) alternately arranged in the circumferential direction. In this case, a height from the core 46 to a surface of the closure member 45 may be less than a protrusion height of each rotor magnet 42 from the core 46.

In the exemplary embodiment shown in FIG. 2, the number of stator coils 24, rotor magnets 42, magnetic pole pieces 32, and stator magnets 22 are in ascending order.
(Overview of Cooling Structure of Magnetic Geared Electrical Machine 10)

In the magnetic geared electrical machine 10 (10A, 10B) having the above configuration, heat generation due to copper loss in the stator coil 24 or iron loss in the magnetic pole piece 32, heat retention inside the magnetic geared electrical machine 10, or the like may occur. Therefore, a cooling structure is adopted in the magnetic geared electrical machine 10. The overview thereof will be described below.

Figure 3:
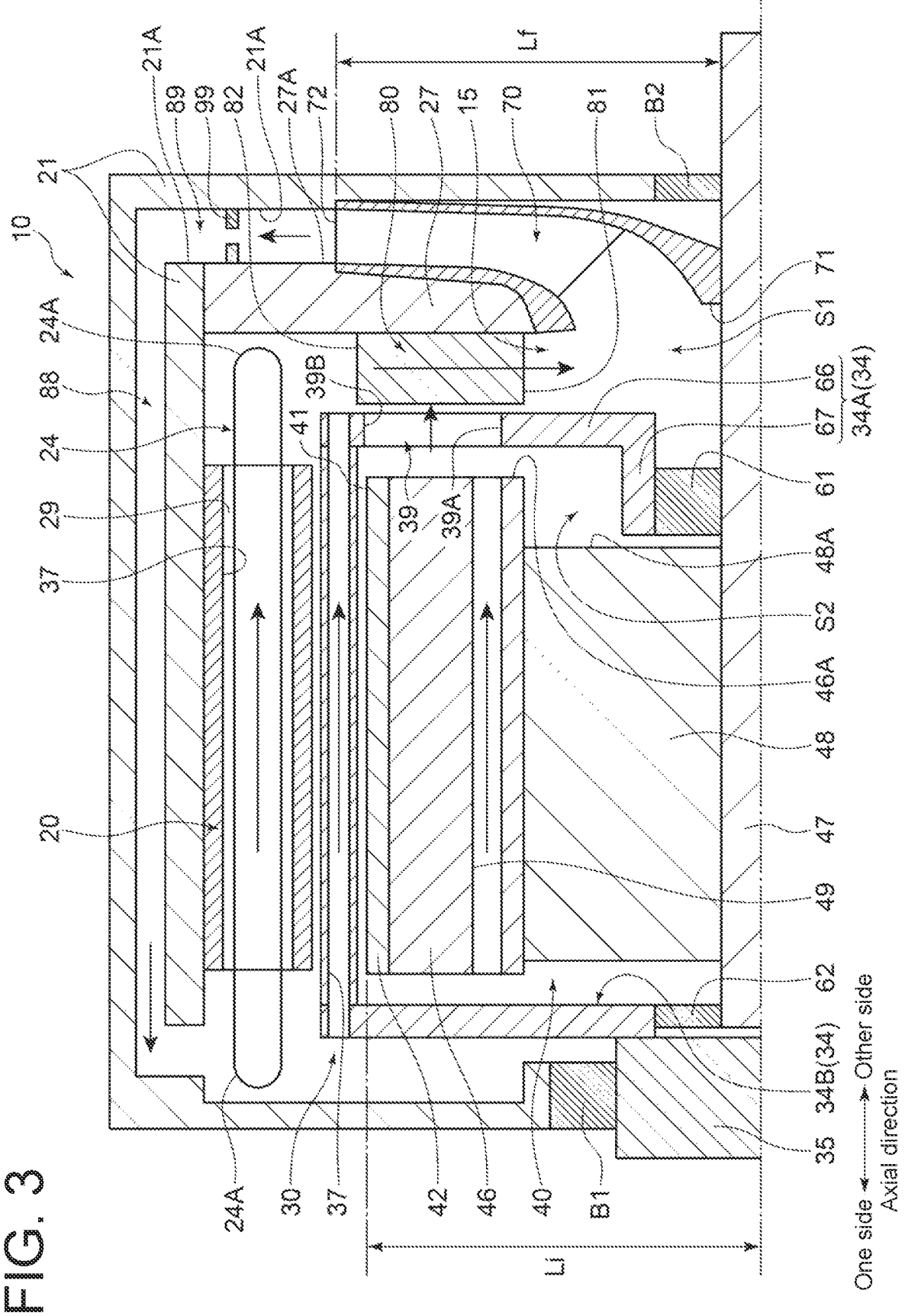
FIG. 3 is an axial cross-sectional view of the magnetic geared electrical machine according to an embodiment.

FIG. 3 is an axial cross-sectional view showing the internal structure of the magnetic geared electrical machine according to an embodiment.

The magnetic geared electrical machine 10 according to some embodiments includes a fan 70 for cooling at least one of the stator 20, the magnetic pole piece rotor 30, or the inner rotor 40. This fan 70 is attached to the inner rotor 40 on an opposite side to the power transmission shaft 35 with the rotor magnet 42 therebetween in the axial direction. That is, the power transmission shaft 35, the rotor magnet 42, and the fan 70 are disposed in this order from the one side in the axial direction. As a more specific example, the fan 70 is located on the other side in the axial direction relative to the first end plate 34A. Among the pair of end plates 34 included in the magnetic pole piece rotor 30, the first end plate 34A is located on the opposite side (that is, the other side in the axial direction) to the power transmission shaft 35.

The stator 20, the magnetic pole piece rotor 30, the inner rotor 40, and the fan 70 are accommodated in the housing 21. The housing 21 may be a closed housing that closes an internal space, or an open housing that includes a communication port, such as a louver or a duct, communicating with an external space.

During operation of the magnetic geared electrical machine 10, the fan 70 rotating together with the inner rotor 40 sends out air taken in from the upstream side to the downstream side. Whereby, the air flowing inside the housing 21 cools at least one of the stator 20, the magnetic pole piece rotor 30, or the inner rotor 40. In an embodiment where the closed housing is adopted, the air flowing inside the housing 21 is circulating air. Further, in another embodiment where the open housing is adopted, outside air may flow into the housing 21 from an inlet port and may be discharged from an outlet port via the fan 70. As an example, the inlet port and the outlet port are communication ports disposed in the housing 21. The inlet port may be located on the one side in the axial direction, and the outlet port may be located on the other side in the axial direction.

The housing 21 of the present embodiment rotatably supports the power transmission shaft 35 via the above-described bearing B1, and also rotatably supports the rotational shaft 47 of the inner rotor 40 via the above-described bearing B2.

The housing 21 according to an embodiment is provided with a housing ventilation path 89 which is a path for the air sent out by the fan 70, and at least one ventilation path 88 (details will be described later). The housing 21 according to another embodiment may not be provided with at least either of the housing ventilation path 89 or the ventilation path 88. For example, if the open housing is adopted, the ventilation path 88 may not be formed. At this time, the above-described outlet port may be located radially outward of the housing ventilation path 89.

According to the above configuration, since the fan 70 is attached to the inner rotor 40 rotating at a higher speed than the magnetic pole piece rotor 30, the rotation speed of the fan 70 increases. Further, due to the reason that, for example, the power transmission shaft 35 is disposed on the one side in the axial direction relative to the plurality of rotor magnets 42, there may be a restriction that it is difficult to secure a space for installing the fan 70. In this regard, in the present example, since the fan 70 is disposed on the opposite side to the power transmission shaft 35 with respect to the plurality of magnetic pole pieces 32, it is possible to reduce the restriction regarding the installation area of the fan 70 and it is possible to increase a radial length of the fan 70. Therefore, the flow rate of air flowing with rotation of the fan 70 increases. In view of the above, the magnetic geared electrical machine 10 is implemented which is capable of sufficiently exhibiting cooling performance.

The present disclosure does not exclude the embodiment where another fan for cooling at least one of the stator 20, the magnetic pole piece rotor 30, or the inner rotor 40 is additionally disposed on the one side in the axial direction relative to the rotor magnet 42. The fan other than the fan 70 can be disposed by appropriately changing the power transmission shaft 35, the second end plate 34B, the housing 21, and the like illustrated in FIG. 3.

In some embodiments, at least part of the fan 70 is disposed radially inward of the rotor magnet 42. As a more specific example, not less than half the fan 70 in the radial direction is located radially inward of the rotor magnet 42. Further, the fan 70 of the present example is directly connected to the rotational shaft 47 of the inner rotor 40. For example, the fan 70 is directly connected to the rotational shaft 47 by holes respectively disposed in the rotational shaft 47 and the fan 70, and fastening members, such as bolts, inserted into these holes.

In the example of FIG. 3, an inlet 71 of the fan 70 is disposed radially inward of the rotor magnet 42. In the example of FIG. 3, the inlet 71 is an end portion of the fan 70 on the one side in the axial direction. As the fan 70 rotates together with the inner rotor 40, air flows from the inlet 71 to an outlet 72 of the fan 70 and is sent out to the above-described housing ventilation path 89 as an example. The inlet 71 of the fan 70 may be disposed radially inward of the core 46 provided with the rotor magnet 42.

According to the above configuration, since at least part of the fan 70 is disposed radially inward of the rotor magnet 42, the fan 70 can be elongated in the radial direction. Further, since the inlet 71 of the fan 70 is disposed radially inward of the rotor magnet 42, the fan 70 can further be elongated in the radial direction. Therefore, the magnetic geared electrical machine 10 can increase the flow rate of the air sent out by the fan 70 and can sufficiently exhibit cooling performance.

In some embodiments, the outlet 72 of the fan 70 is located radially outward of an outer end 41 of the inner rotor 40 in the radial direction. As a more specific example, the radial length (corresponding to a dimension Lf in the example of FIG. 3) of the fan 70 is longer than half the radial length (corresponding to a dimension Li in the example of FIG. 3) of the inner rotor 40.

In the example of FIG. 3, the outlet 72 is the radially outer end of the fan 70 and is disposed radially outward of the rotor magnet 42. According to the above configuration, since the outlet 72 of the fan 70 is disposed radially outward of the outer end 41 of the inner rotor 40, the fan 70 can be elongated in the radial direction. Further, since the dimension Lf is longer than the dimension Li, the fan 70 can further be elongated in the radial direction. Therefore, the magnetic geared electrical machine 10 can increase the flow rate of the air sent out by the fan 70 and can sufficiently exhibit cooling performance.

Even if the dimension Lf is shorter than the dimension Li, the outlet 72 of the fan 70 can be disposed radially outward of the outer end 41 of the inner rotor 40. At this time, a radial distance between the outlet 72 of the fan 70 and the outer end 41 of the inner rotor 40 may be greater than 0 and less than the radius of the rotational shaft 47.

In addition to the above-described components shown in FIGS. 1A, 1B, and 2, the inner rotor 40 illustrated in FIG. 3 further includes a support part 48 extending radially outwardly from the rotational shaft 47 to support the plurality of rotor magnets 42. The radially outer end of the support part 48 in the present example is connected to the core 46 provided with the rotor magnet 42. The support part 48 according to an embodiment has a columnar or tubular shape along the axial direction as illustrated in FIG. 3. The support part 48 according to another embodiment may be formed of a plurality of plates (not shown) having thickness in the axial direction. The plurality of plates are disposed at intervals in the axial direction.

The magnetic geared electrical machine 10 illustrated in FIG. 3 includes a first bearing 61 and a second bearing 62. The first bearing 61 is disposed between the rotational shaft 47 and the first end plate 34A, among the pair of end plates 34 included in the magnetic pole piece rotor 30, located on the opposite side (that is, the other side in the axial direction) to the power transmission shaft 35. The second bearing 62 is disposed between the rotational shaft 47 and the second end plate 34B, among the pair of end plates 34, located on the one side in the axial direction.

According to the above configuration, the magnetic pole piece rotor 30 is rotatably held by the rotational shaft 47 via the first bearing 61. This eliminates the need for a bracket which is fixed to the housing 21 and is configured to rotatably hold the magnetic pole piece rotor 30, for example. Therefore, an air flow path inside the housing 21 can be secured in the axial direction without increasing the size of the housing 21. For example, a space S1 located at an axial position between the inlet 71 of the fan 70 and the first end plate 34A is secured in the axial direction, reducing a pressure loss of the air flowing to the inlet 71 and allowing the fan 70 to efficiently send out air.

In some embodiments, an end face 48A of the support part 48 on the other side is located on the one side relative to a core end face 46A which is an end face of the core 46 on the other side, in the axial direction. Consequently, a space S2 is formed radially inward of the core end face 46A. The above-described first bearing 61 is disposed in the space S2, and at least part of the first bearing 61 overlaps the core 46 in the axial direction. That is, at least part of the first bearing 61 is disposed at the same axial position as the core 46.

As an example of a specific structure, the first end plate 34A includes an extending section 66 extending radially on the other side in the axial direction relative to the core end face 46A, and a projecting section 67 projecting from the extending section 66 to the one side in the axial direction. A distal end portion of the projecting section 67 is disposed in the space S2, and the first bearing 61 is disposed between the distal end portion and the rotational shaft 47.

According to the above configuration, the core 46 and the first bearing 61 overlap in the axial direction, and the first bearing 61 is accordingly disposed on the one side in the axial direction, allowing the magnetic geared electrical machine 10 to expand the space S1 between the first end plate 34A and the fan 70 in the axial direction while suppressing the increase in size. As a result, the pressure loss of the air flowing to the inlet 71 is further reduced, allowing the fan 70 to send out air more efficiently.

(Path for Air for Cooling Magnetic Geared Electrical Machine 10)

Next, a path for the air for cooling the magnetic geared electrical machine 10 will be described will be described with reference to FIG. 3. The above-described space S1 located upstream of the inlet 71 of the fan 70 communicates with an inlet flow path 15 extending in the radial direction. The inlet flow path 15 of the present example is defined by the first end plate 34A and a bracket 27. Further upstream of the inlet flow path 15, flow paths for air to flow toward the other side in the axial direction are respectively formed in the inner rotor 40, the magnetic pole piece rotor 30, and the stator 20. Hereinafter, these flow paths will sequentially be described.

The core 46 of the inner rotor 40 has an inner ventilation path 49 extending along the axial direction. The inner ventilation path 49 communicates with an opening 39 of the first end plate 34A. In the example of FIG. 3, the opening 39 disposed in the extending section 66 overlaps the inner ventilation path 49 in the radial direction. A plurality of inner ventilation paths 49 and openings 39 may be disposed in the circumferential direction. Further, the number of inner ventilation paths 49 and the number of openings 39 may be the same or may be different.

As the inner rotor 40 and the fan 70 rotate integrally, air flows through the inner ventilation path 49 to the other side in the axial direction and reaches the inlet flow path 15 via the opening 39.

The magnetic pole piece rotor 30 includes a magnetic pole piece ventilation path 37 extending along the axial direction on the radially outer side of the plurality of rotor magnets 42. As an example, the magnetic pole piece ventilation path 37 is disposed in each of the plurality of non-magnetic members 33 (see FIG. 2) described above. As another example, the magnetic pole piece ventilation path 37 may be disposed in each of the plurality of magnetic pole pieces 32 (see FIG. 2) described above. The stator 20 includes a stator ventilation path 29 extending in the axial direction. As an example, the stator ventilation path 29 is defined by the slot 25 (see FIG. 2). Therefore, a plurality of stator ventilation paths 29 are disposed. As another example, the stator ventilation path 29 may be a hole different from the slot 25 disposed in the stator core 23 (see FIG. 2).

If the magnetic pole piece rotor 30 rotates during operation of the magnetic geared electrical machine 10, air flows through the magnetic pole piece ventilation path 37 to the other side in the axial direction, and at this time, other air flows to the other side in the axial direction in the stator ventilation path 29 as well. The air flowing through the magnetic pole piece ventilation path 37 and the other air flowing through the stator ventilation path 29 join in the inlet flow path 15 the air having sequentially flowed through the inner ventilation path 49 and the opening 39, and flow to the inlet 71 of the fan 70 via the space S1.

The air having reached the inlet 71 is sent out from the outlet 72 by the rotation of the fan 70, flows through the housing ventilation path 89 radially outward, and then flows through the ventilation path 88 to the one side in the axial direction. Thereafter, the air reaches the inner ventilation path 49, the magnetic pole piece ventilation path 37, or the stator ventilation path 29 described above.

In the embodiment where the housing 21 is the open housing, the air flowing into the housing 21 from the inlet port may be discharged to the outside from the outlet port through the fan 70 and the housing ventilation path 89 sequentially, after flowing through the inner ventilation path 49, the magnetic pole piece ventilation path 37, or the stator ventilation path 29.

(Configuration of Baffle Plate 80)

In some embodiments, the magnetic geared electrical machine 10 further includes a baffle plate 80. As described above, the air flowing through the inlet flow path 15 toward the fan 70 includes the air discharged from the rotating inner ventilation path 49 or the rotating magnetic pole piece ventilation path 37, and the air flowing through the inlet flow path 15 toward the fan 70 has a swirl component. The baffle plate 80 suppresses this swirl component, increasing the relative speed of this air with respect to the rotating fan 70. As a result, the fan 70 can apply a sufficient swirling force to the air and vigorously send out the air from the outlet 72, promoting the flow of the air inside the housing 21. Hereinafter, details of the baffle plate 80 will be exemplified.

As illustrated in FIG. 3, the baffle plate 80 extending along the radial direction is fixed to the bracket 27 at an axial position between the inner ventilation path 49 and the fan 70. Since the baffle plate 80 is disposed at this axial position, the air having sequentially flowed through the inner ventilation path 49 of the inner rotor 40 and the opening 39 of the first end plate 34A hits the baffle plate 80, making it possible to reduce the swirl component of this air. In the example of FIG. 3, the baffle plate 80 is disposed radially outward of the inlet 71 of the fan 70.

According to the above configuration, since the inner rotor 40 is configured to rotate at a higher speed than the magnetic pole piece rotor 30, the swirl component of the air flowing from the inner ventilation path 49 to the fan 70 is large. Since the baffle plate 80 reduces the swirl component of this air, the relative speed of the air with respect to the rotating fan 70 can be increased at the inlet 71. Therefore, the fan 70 can apply the sufficient swirling force and send out the air from the outlet 72, promoting the flow of the air associated with the rotation of the fan 70.

In addition to the above-described air, the air discharged from the magnetic pole piece ventilation path 37 and the air discharged from the stator ventilation path 29 may hit the baffle plate 80. In particular, since the air discharged from the magnetic pole piece ventilation path 37 and having the swirl component hits the baffle plate 80, it is possible to further reduce the swirl component of the air directed toward the fan 70.

In some embodiments, at least part of the baffle plate 80 is axially overlaps the coil end portion 24A on the fan 70 side among the pair of coil end portions 24A of the stator coil 24 respectively disposed at both ends in the axial direction. According to the above configuration, it is possible to prevent the installation space for the baffle plate 80 from increasing in the axial direction by the amount of the overlap between the baffle plate 80 and the stator coil 24. Therefore, it is possible to suppress the increase in size of the magnetic geared electrical machine 10.

In some embodiments, an inner end 81 of the baffle plate 80 in the radial direction is located radially inward of an inner end 39A of the opening 39 in the first end plate 34A. In other words, the opening 39 of the first end plate 34A communicates with the inner ventilation path 49 on a radially outer side of the inner end 81 of the baffle plate 80 in the radial direction. According to the above configuration, since at least part of the baffle plate 80 is located radially inward of the opening 39 of the first end plate 34A, it is possible to increase the radial length of the baffle plate 80. Further, since the baffle plate 80 and the opening 39 are in the above-described positional relationship, the air having sequentially flowed through the inner ventilation path 49 and the opening 39 can more reliably pass through the baffle plate 80. Whereby, it is possible to more reliably and sufficiently reduce the swirl component included in the air having sequentially flowed through the inner ventilation path 49 and the opening 39.

In some embodiments, an outer end 82 of the baffle plate 80 in the radial direction is located radially outward of an outer end 39B of the opening 39 in the first end plate 34A. In other words, the opening 39 of the first end plate 34A communicates with the inner ventilation path 49 on a radially inner side of the outer end 82 of the baffle plate 80 in the radial direction. According to the above configuration, since at least part of the baffle plate 80 is located radially inward of the opening 39 of the first end plate 34A, it is possible to increase the radial length of the baffle plate 80. Whereby, it is possible to sufficiently reduce the swirl component included in the air having sequentially flowed through the inner ventilation path 49 and the opening 39.

In the embodiment illustrated in FIG. 3, the outer end 82 of the baffle plate 80 is disposed radially inward of the outer end of the magnetic pole piece rotor 30 in the radial direction. The outer end 82 according to another embodiment may be located radially outward of the magnetic pole piece rotor 30.

Figure 4:
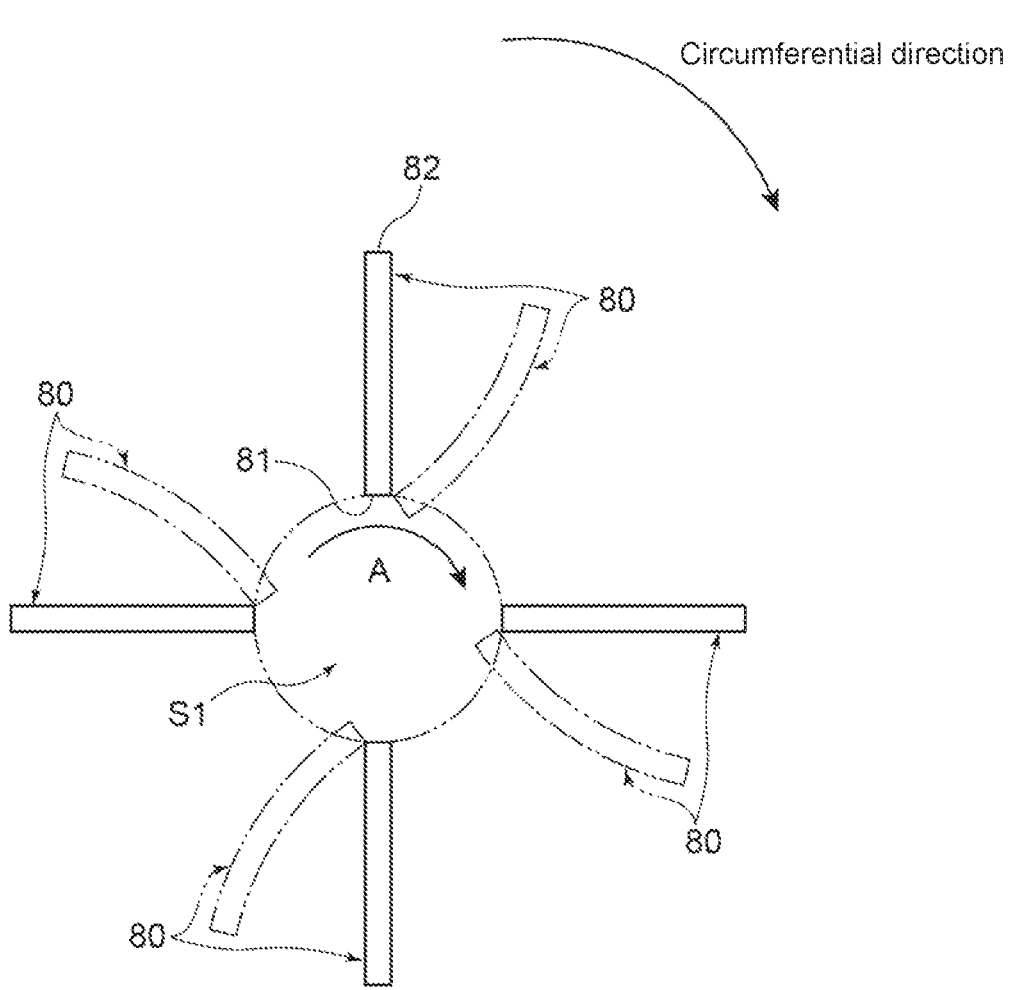
FIG. 4 is a schematic view showing a baffle plate as viewed in the axial direction according to an embodiment.

FIG. 4 is a schematic view showing the baffle plate as viewed in the axial direction according to an embodiment. As illustrated in FIG. 4, a plurality of baffle plates 80 are disposed along the circumferential direction based on the axial direction. In the example of FIG. 4, each baffle plate 80 extends linearly along the radial direction.

The air whose swirl component has been reduced by the baffle plate 80 may still include a swirl component in a direction of an arrow A. or may include a swirl component in a direction opposite to the direction of the arrow A.

According to the above configuration, since the plurality of baffle plates 80 are provided, it is possible to more effectively reduce the swirl component included in the air flowing from the inner ventilation path 49 (see FIG. 2) to the fan 70.

In another embodiment, the baffle plate 80 may extend in a curved manner along the radial direction. As a specific example, the baffle plate 80 may extend in a curved manner toward the direction opposite to the rotation direction (arrow A) of the inner rotor 40 and the fan 70, and toward the inner side in the radial direction. The baffle plate 80 according to another embodiment is illustrated by a double-dotted chain line in FIG. 4. The air discharged from the inner ventilation path 49 reaches the baffle plate 80 while swirling in the same rotation direction as the inner rotor 40. As this air flows radially inward along the baffle plate 80 curved as described above, the swirl component of the air is effectively reduced by the baffle plate 80.

(Path for Air Sent Out by Fan 70)

Returning to FIG. 3, the path for the air sent out by the fan 70 will be described in detail. As described above, the housing 21 defines the housing ventilation path 89 which is the path for the air sent out by the fan 70, and the at least one ventilation path 88. The housing ventilation path 89 communicating with the outlet 72 of the fan 70 and the ventilation path 88 is defined by a wall surface 27A of the bracket 27 and a wall surface 21A of the housing 21.

In some embodiments, the magnetic geared electrical machine 10 includes a restriction 99 disposed in the housing ventilation path 89. The restriction 99 is a mechanism configured to drop a pressure in the housing ventilation path 89. An orifice restriction, a choke restriction, or the like may be adopted as the specific restriction 99.

If the rotational speed of the inner rotor 40 becomes excessive when the magnetic geared electrical machine 10 operates, a phase difference angle determined by a rotation angle phase of the inner rotor 40 and a rotation angle phase of the magnetic pole piece rotor 30 becomes excessive, which may cause step-out in the magnetic geared electrical machine 10. In this regard, according to the above configuration, as the rotational speed of the inner rotor 40 becomes excessive, the flow rate of the air flowing through the housing ventilation path 89 increases, and the pressure loss in the restriction 99 increases. As a result, the air brake effect on the fan 70 increases, making it possible to decelerate the inner rotor 40. Therefore, it is possible to prevent the rotational speed of the inner rotor 40 from becoming excessive, making it possible to suppress step-out in the magnetic geared electrical machine 10.

Note that the restriction 99 is not connected to a controller including a processor, and the amount of the pressure drop in the restriction 99 is not electronically controlled. That is, the pressure drop always occurs in the restriction 99 if air flows through the housing ventilation path 89. However, the pressure loss in the restriction 99 is proportional to the square of the flow rate of air, and the flow rate of air is proportional to the rotation speed of the fan 70. Therefore, if the rotation speed of the fan 70 is relatively low, the air brake effect is very small and the influence on the rotation of the inner rotor 40 is small.

The downstream side of the housing ventilation path 89 includes at least one ventilation path 88 axially extending on the radially outer side of the stator 20. The ventilation path 88 forms a flow path for the air flowing inside the housing 21 with rotation of the fan 70. In the example of FIG. 3, the air having flowed through the housing ventilation path 89 flows through the ventilation path 88 to the one side in the axial direction. The air having flowed through the ventilation path 88 flows radially inward of the ventilation path 88, and, for example, flows through the stator ventilation path 29, the magnetic pole piece ventilation path 37, or the inner ventilation path 49 to the other side in the axial direction.

According to the above configuration, the air sent out by the fan 70 flows through the ventilation path 88 located radially outward of the stator 20, allowing the air inside the housing 21 to flow between the radially outer side of the stator 20 and the radially inner side of the ventilation path 88. Consequently, the air flow inside the housing 21 is promoted, making it possible to improve the cooling performance of the magnetic geared electrical machine 10. In particular, in the embodiment where the closed housing is adopted, the flow of circulating air in the housing 21 is promoted, making it possible to obtain an advantage that heat is less likely to accumulate in the closed space inside the housing 21.

Figure 5:
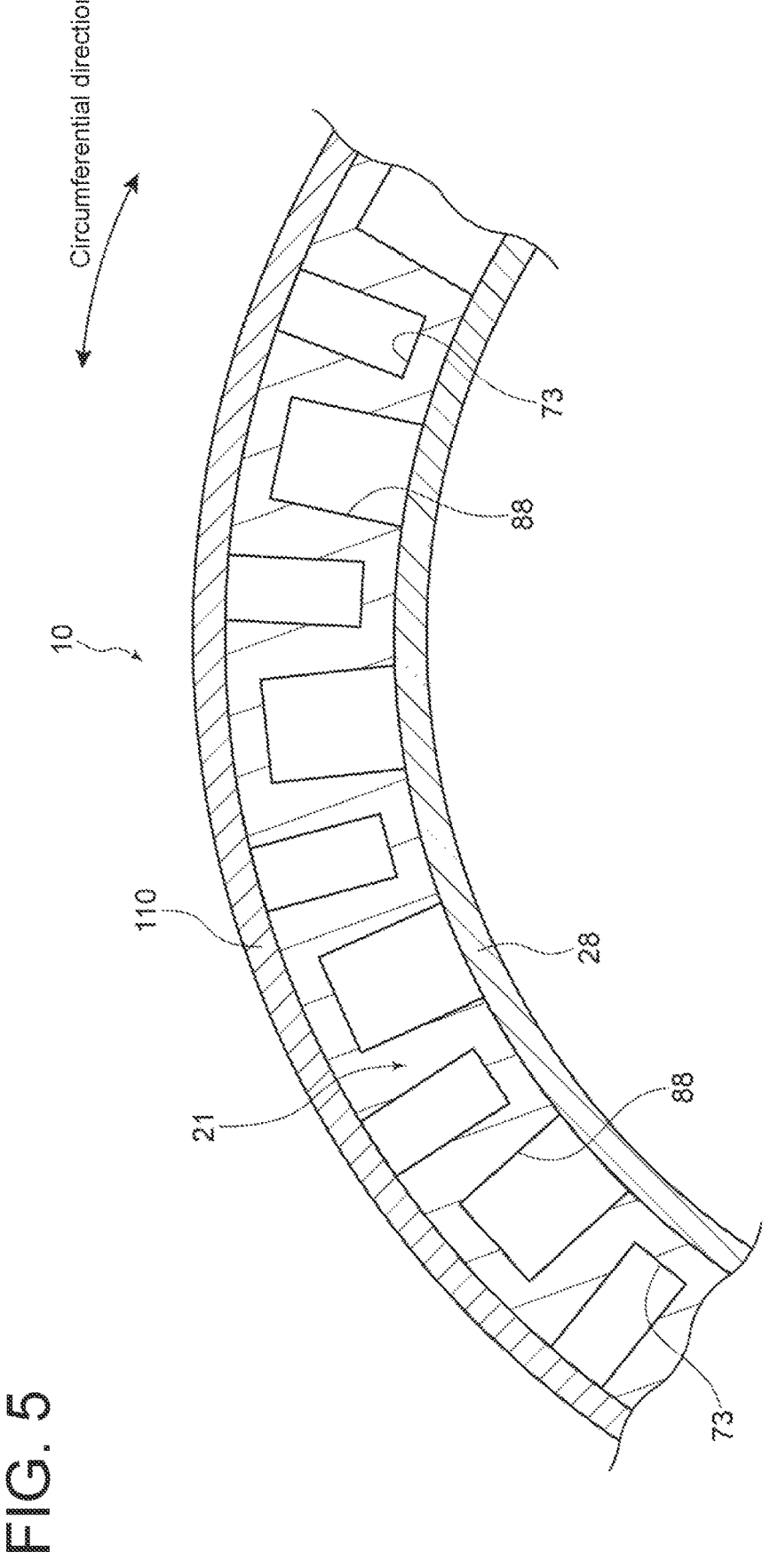
FIG. 5 is a schematic view showing a housing as viewed in the axial direction according to an embodiment.

FIG. 5 is a schematic view showing the housing 21 as viewed in the axial direction according to an embodiment. The magnetic geared electrical machine 10 illustrated in FIG. 5 further includes an outer cover 110 for covering the housing 21 from the radially outer side.

In the example of FIG. 5, the housing 21 is provided with a plurality of the above-described ventilation paths 88 disposed along the circumferential direction. The ventilation path 88 of the present example is a groove disposed in the housing 21 and extending along the axial direction, and is covered with an inner cover 28. Further, the housing 21 includes the plurality of ventilation paths 88 and a plurality of outside-air paths 73 arranged alternately with each other. The outside-air path 73 of the present example is a groove disposed in the housing 21 and extending along the axial direction, and is covered with the outer cover 110. Axial both ends of the outside-air path 73 and axial both ends of the outer cover 110 are open in the axial direction, allowing outside air to flow through the outside-air path 73 along the axial direction. The outside air flowing through the outside-air path 73 exchanges heat with the air flowing through the ventilation path 88, thereby cooling the air flowing through the ventilation path 88. The cooled air flows inside the housing 21, thereby cooling at least one of the stator 20, the magnetic pole piece rotor 30, or the inner rotor 40.

In the example of FIG. 3, both the housing 21 and the outer cover 110 have a cylindrical shape extending in the axial direction, but in another embodiment, they may have a rectangular cylindrical shape along the axial direction. Further, the magnetic geared electrical machine 10 may not include the outer cover 110. In this case, the outside-air path 73 is opened in the axial direction and is opened radially outward.

According to the above configuration, since the plurality of ventilation paths 88 and the plurality of outside-air paths 73 are disposed alternately in the circumferential direction, a heat transfer area between the outside air flowing through the outside-air path 73 and the air flowing through the ventilation path 88 increases. Therefore, the magnetic geared electrical machine 10 can more effectively cool the air flowing through the plurality of ventilation paths 88, and can improve cooling performance.

The housing 21 according to some embodiments is the closed housing for closing the internal space. In this case, the air flowing through the ventilation path 88 includes almost no outside air. According to the above configuration, it is possible to prevent the stator 20, the magnetic pole piece rotor 30, the inner rotor 40, and the fan 70 from being exposed to the outside air, making it possible to suppress deterioration such as corrosion in these components.

(Conclusion)

Hereinafter, the overview of the magnetic geared electrical machine 10, the power generation system 1, and the drive system 2 according to some embodiments will be described.

1) A magnetic geared electrical machine (10) according to at least one embodiment of the present disclosure, includes: a stator (20); a magnetic pole piece rotor (30) including a plurality of magnetic pole pieces (32) disposed radially inward of the stator (20); an inner rotor (40) including a plurality of rotor magnets (42), disposed radially inward of the plurality of magnetic pole pieces (32), and configured to rotate at a higher speed than the magnetic pole piece rotor (30); and a fan (70) for cooling at least one of the stator (20), the magnetic pole piece rotor (30), or the inner rotor (40). The magnetic pole piece rotor (30) further includes a power transmission shaft (35) disposed on one side in an axial direction relative to the plurality of magnetic pole pieces (32), and configured to transmit rotational power to and from an external device (7). The fan (70) is attached to the inner rotor (40) on an opposite side to the power transmission shaft (35) with the rotor magnet (42) therebetween in the axial direction.

According to the above configuration 1), since the fan (70) is attached to the inner rotor (40) rotating at a higher speed than the magnetic pole piece rotor (30), the rotation speed of the fan (70) increases. Further, since the fan (70) is disposed on the opposite side to the power transmission shaft (35) with respect to the plurality of magnetic pole pieces (32), it is possible to reduce the restriction regarding the installation area of the fan (70) and it is possible to increase a radial length of the fan (70). Therefore, the flow rate of the air flowing with rotation of the fan (70) increases, and the magnetic geared electrical machine (10) is implemented which is capable of sufficiently exhibiting cooling performance.

2) In some embodiments, the magnetic geared electrical machine (10) as defined in the above 1), wherein at least part of the fan (70) is disposed radially inward of the rotor magnet (42).

According to the above configuration 2), since at least part of the fan (70) is disposed radially inward of the rotor magnet (42), the fan (70) can be elongated in the radial direction. Therefore, the magnetic geared electrical machine (10) can increase the flow rate of the air sent out by the fan (70) and can sufficiently exhibit cooling performance.

3) In some embodiments, the magnetic geared electrical machine (10) as defined in the above 1) or 2), wherein an inlet (71) of the fan (70) is disposed radially inward of the rotor magnet (42).

According to the above configuration 3), since the inlet (71) of the fan (70) is disposed radially inward of the rotor magnet (42), the fan (70) can be elongated in the radial direction. Therefore, the magnetic geared electrical machine (10) can increase the flow rate of the air sent out by the fan (70) and can sufficiently exhibit cooling performance.

4) In some embodiments, the magnetic geared electrical machine (10) as defined in any of the above 1) to 3), wherein an outlet (72) of the fan (70) is located radially outward of an outer end (41) of the inner rotor (40) in a radial direction.

According to the above configuration 4), since the fan (70) can be elongated in the radial direction, it is possible to increase the flow rate of the air sent out by the fan (70) and it is possible to sufficiently exhibit cooling performance.

5) In some embodiments, the magnetic geared electrical machine (10) as defined in any of the above 1) to 4), wherein a radial length (dimension Lf) of the fan (70) is greater than half a radial length (dimension Li) of the inner rotor (40).

According to the above configuration 5), the fan (70) can be elongated in the radial direction, and the flow rate of the air sent out by the fan (70) can further be increased.

6) In some embodiments, the magnetic geared electrical machine (10) as defined in any of the above 1) to 5), wherein the inner rotor (40) further includes: a rotational shaft (47): and a support part (48) extending radially outward from the rotational shaft (47) and supporting the plurality of rotor magnets (42), wherein the magnetic pole piece rotor (30) further includes: a pair of end plates (34) respectively disposed on both sides of the plurality of magnetic pole pieces (32) in the axial direction, and wherein the magnetic geared electrical machine (10) further includes a first bearing (61) disposed between the rotational shaft (47) and a first end plate (34A), among the pair of end plates (34), located on the opposite side to the power transmission shaft (35).

According to the above configuration 6), a bracket is no longer needed which is fixed to the inside of the magnetic geared electrical machine (10) and is configured to rotatably hold the magnetic pole piece rotor (30). Therefore, the magnetic geared electrical machine (10) can internally secure an air flow path in the axial direction without increasing in size.

7) In some embodiments, the magnetic geared electrical machine (10) as defined in the above 6), wherein the inner rotor (40) includes a core (46) provided with the plurality of rotor magnets (42), and wherein at least part of the first bearing (61) overlaps the core (46) in the axial direction.

According to the above configuration 7), the core (46) and the first bearing (61) overlap, and the first bearing (61) is accordingly disposed on the one side in the axial direction, allowing the magnetic geared electrical machine (10) to expand the space (S1) between the first end plate (34A) and the fan (70) in the axial direction while suppressing the increase in size.

8) In some embodiments, the magnetic geared electrical machine (10) as defined in any of the above 1) to 7), wherein the inner rotor (40) includes a core (46) provided with the plurality of rotor magnets (42), wherein the core (46) has an inner ventilation path (49) extending along the axial direction, and wherein the magnetic geared electrical machine (10) further includes: a housing (21) for accommodating the stator (20), the magnetic pole piece rotor (30), the inner rotor (40), and the fan (70); and a baffle plate (80) fixed to the housing (21) at an axial position between the inner ventilation path (49) and the fan (70), and extending along a radial direction.

According to the above configuration 8), since the inner rotor (40) is configured to rotate at a higher speed than the magnetic pole piece rotor (30), the swirl component of the air flowing from the inner ventilation path (49) to the fan (70) is large. Since the baffle plate (80) hit with the air discharged from the inner ventilation path (49) reduces the swirl component, the relative speed of the air with respect to the rotating fan (70) can be increased. Therefore, the fan (70) can send out the air provided with the sufficient swirling force, promoting the flow of the air.

9) In some embodiments, the magnetic geared electrical machine (10) as defined in the above 8), further includes: a plurality of the baffle plates (80) disposed along a circumferential direction based on the axial direction.

According to the above configuration 9), it is possible to more effectively reduce the swirl component included in the air flowing from the inner ventilation path (49) to the fan (70).

10) In some embodiments, the magnetic geared electrical machine (10) as defined in the above 8) or 9), wherein the baffle plate (80) extends in a curved manner toward a direction opposite to a rotation direction of the inner rotor (40), and toward an inner side in the radial direction.

According to the above configuration 10), as the air having reached the baffle plate (80) from the inner ventilation path (49) flows radially inward, its swirl component is reduced. Therefore, it is possible to more effectively reduce the swirl component included in the air flowing from the inner ventilation path (49) to the fan (70).

11) In some embodiments, the magnetic geared electrical machine (10) as defined in any of the above 8) to 10), wherein the stator (20) includes a stator coil (24) having a pair of coil end portions (24A) respectively at both ends in the axial direction, and wherein at least part of the baffle plate (80) overlaps the coil end portion (24A) on a side of the fan (70) in the axial direction.

According to the above configuration 11), it is possible to prevent the installation space for the baffle plate (80) from increasing in the axial direction by the amount of the overlap between the baffle plate (80) and the stator coil (24). Therefore, it is possible to suppress the increase in size of the magnetic geared electrical machine (10).

12) In some embodiments, the magnetic geared electrical machine (10) as defined in any of the above 8) to 11), wherein the magnetic pole piece rotor (30) further includes a pair of end plates (34) respectively disposed on both sides of the plurality of magnetic pole pieces (32) in the axial direction, and wherein, among the pair of end plates (34), a first end plate (34A) located on the opposite side to the power transmission shaft (35) has an opening (39) communicating with the inner ventilation path (49) on a radially outer side of an inner end (81) of the baffle plate (80) in the radial direction.

According to the above configuration 12), since at least part of the baffle plate (80) is located radially inward of the opening (39) of the first end plate (34A), it is possible to increase the radial length of the baffle plate (80). Further, since the baffle plate (80) and the opening (39) are in the above-described positional relationship, the air having sequentially flowed through the inner ventilation path (49) and the opening (39) can more reliably pass through the baffle plate (80). Whereby, it is possible to more reliably and sufficiently reduce the swirl component included in the air having sequentially flowed through the inner ventilation path (49) and the opening (39).

13) In some embodiments, the magnetic geared electrical machine (10) as defined in any of the above 8) to 12), wherein the magnetic pole piece rotor (30) further includes a pair of end plates (34) respectively disposed on both sides of the plurality of magnetic pole pieces (32) in the axial direction, and wherein, among the pair of end plates (34), a first end plate (34A) located on the opposite side to the power transmission shaft (35) has an opening (39) communicating with the inner ventilation path (49) on a radially inner side of an outer end (82) of the baffle plate (80) in the radial direction.

According to the above configuration 13), since at least part of the baffle plate (80) is located radially outward of the opening (39) of the first end plate (34A), it is possible to increase the radial length of the baffle plate (80). Whereby, it is possible to sufficiently reduce the swirl component included in the air having sequentially flowed through the inner ventilation path (49) and the opening (39).

14) In some embodiments, the magnetic geared electrical machine (10) as defined in any of the above 1) to 13), further includes: a housing (21) for accommodating the stator (20), the magnetic pole piece rotor (30), the inner rotor (40), and the fan (70), the housing (21) including a wall surface (21A) defining a housing ventilation path (89) communicating with an outlet (72) of the fan (70); and a restriction (99) disposed in the housing ventilation path (89).

According to the above configuration 14), if the rotational speed of the internal rotor becomes excessive, the pressure loss in the restriction (99) increases, and the air brake effect on the fan (70) increases. Therefore, it is possible to prevent the rotational speed of the internal rotor from becoming excessive, making it possible to suppress step-out in the magnetic geared electrical machine (10).

15) in some embodiments, the magnetic geared electrical machine (10) as defined in any of the above 1) to 14), further includes: a housing (21) for accommodating the stator (20), the magnetic pole piece rotor (30), the inner rotor (40), and the fan (70). The housing (21) includes at least one ventilation path (88) extending in the axial direction on a radially outer side of the stator (20) and forming a flow path for air flowing in the housing (21) with rotation of the fan (70).

According to the above configuration 15), the air sent out by the fan (70) flows through the ventilation path (88) located radially outward of the stator (20), allowing the air inside the housing (21) to flow between the radially outer side of the stator (20) and the radially inner side of the ventilation path (88). Therefore, the magnetic geared electrical machine (10) can improve cooling performance.

16) In some embodiments, the magnetic geared electrical machine (10) as defined in the above 15), wherein the housing (21) includes a plurality of outside-air paths (73) respectively arranged alternately with a plurality of the ventilation paths (88) in a circumferential direction based on the axial direction.

According to the above configuration 16), since the plurality of ventilation paths (88) and the plurality of outside-air paths (73) are disposed alternately in the circumferential direction, a heat transfer area between the outside air flowing through the outside-air path (73) and the air flowing through the ventilation path (88) increases. Therefore, the magnetic geared electrical machine (10) can more effectively cool the air flowing through the plurality of ventilation paths (88), and can improve cooling performance.

17) In some embodiments, the magnetic geared electrical machine (10) as defined in any of the above 1) to 16), further includes: a housing (21) for accommodating the stator (20), the magnetic pole piece rotor (30), the inner rotor (40), and the fan (70), and closing an internal space.

According to the above configuration 17), it is possible to prevent the stator (20), the magnetic pole piece rotor (30), the inner rotor (40), and the fan (70) from being exposed to the outside air, making it possible to suppress deterioration such as corrosion in these components.

(18) A power generation system (1) according to at least one embodiment of the present disclosure, includes: the magnetic geared electrical machine (10) as defined in any of the above 1) to 17), which serves as a magnetic geared generator (10A) configured to generate electric power upon input of rotational power; and the external device (7) which serves as a prime mover including a shaft (3) connected to the power transmission shaft (35) configured such that rotational power is input thereto.

With the above configuration (18), for the same reason described in the above (1), the power generation system (1) is implemented which is capable of sufficiently exhibiting cooling performance.

19) A drive system (2) according to at least one embodiment of the present disclosure, includes: the magnetic geared electrical machine (10) as defined in any of the above 1) to 17), which serves as a magnetic geared motor (10B) configured to output rotational power; and the external device (7) which serves as a drive part including a shaft (3) connected to the power transmission shaft (35) configured to output rotational power.

With the above configuration (19), for the same reason described in the above (1), the drive system (2) is implemented which is capable of sufficiently exhibiting cooling performance.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction". "along a direction", "parallel", "orthogonal". "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1: Power generation system
2: Drive system
3: Shaft
7: External device
10: Magnetic geared electrical machine
20: Stator
21: Housing
24: Stator coil
24A: Coil end portion
26A, 27A: Wall surface
30: Magnetic pole piece rotor
32: Magnetic pole piece
34: End plate
34A: First end plate
35: Power transmission shaft
39: Opening
39A: Inner end
39B: Outer end
40: Inner rotor
41: Outer end
42: Rotor magnet
46: Core
47: Rotational shaft
48: Support part
49: Inner ventilation path
61: First bearing
70: Fan
71: Inlet
72: Outlet
73: Outside-air path

80: Baffle plate
81: Inner end
82: Outer end
88: Ventilation path
89: Housing ventilation path
99: Restriction

The invention claimed is:
1. A magnetic geared electrical machine, comprising:
a stator;
a magnetic pole piece rotor including a plurality of magnetic pole pieces disposed radially inward of the stator;
an inner rotor including a plurality of rotor magnets, disposed radially inward of the plurality of magnetic pole pieces, and configured to rotate at a higher speed than the magnetic pole piece rotor; and
a fan for cooling at least one of the stator, the magnetic pole piece rotor, or the inner rotor,
wherein the magnetic pole piece rotor further includes a power transmission shaft disposed on one side in an axial direction relative to the plurality of magnetic pole pieces, and configured to transmit rotational power to and from an external device,
wherein the fan is attached to the inner rotor on an opposite side to the power transmission shaft with the rotor magnets therebetween in the axial direction,
wherein the inner rotor includes a core provided with the plurality of rotor magnets,
wherein the core has an inner ventilation path extending along the axial direction, and
wherein the magnetic geared electrical machine further comprises:
a housing for accommodating the stator, the magnetic pole piece rotor, the inner rotor, and the fan; and
a baffle plate fixed to the housing at an axial position between the inner ventilation path and the fan, and extending along a radial direction.
2. The magnetic geared electrical machine according to claim 1,
wherein at least part of the fan is disposed radially inward of the rotor magnets.
3. The magnetic geared electrical machine according to claim 1,
wherein an inlet of the fan is disposed radially inward of the rotor magnets.
4. The magnetic geared electrical machine according to claim 1,
wherein an outlet of the fan is located radially outward of an outer end of the inner rotor in a radial direction.
5. The magnetic geared electrical machine according to claim 1,
wherein a radial length of the fan is greater than half a radial length of the inner rotor.
6. The magnetic geared electrical machine according to claim 1,
wherein the inner rotor further includes:
a rotational shaft; and
a support part extending radially outward from the rotational shaft and supporting the plurality of rotor magnets,
wherein the magnetic pole piece rotor further includes:
a pair of end plates respectively disposed on both sides of the plurality of magnetic pole pieces in the axial direction, and
wherein the magnetic geared electrical machine further comprises a first bearing disposed between the rota- tional shaft and a first end plate, among the pair of end plates, located on the opposite side to the power transmission shaft.
7. The magnetic geared electrical machine according to claim 6,
wherein at least part of the first bearing overlaps the core in the axial direction.
8. The magnetic geared electrical machine according to claim 1, further comprising:
a plurality of the baffle plates disposed along a circumferential direction based on the axial direction.
9. The magnetic geared electrical machine according to claim 1,
wherein the baffle plate extends in a curved manner toward a direction opposite to a rotation direction of the inner rotor, and toward an inner side in the radial direction.
10. The magnetic geared electrical machine according to claim 1,
wherein the stator includes a stator coil having a pair of coil end portions respectively at both ends in the axial direction, and
wherein at least part of the baffle plate overlaps the coil end portion on a side of the fan in the axial direction.
11. The magnetic geared electrical machine according to claim 1,
wherein the magnetic pole piece rotor further includes a pair of end plates respectively disposed on both sides of the plurality of magnetic pole pieces in the axial direction, and
wherein, among the pair of end plates, a first end plate located on the opposite side to the power transmission shaft has an opening communicating with the inner ventilation path on a radially outer side of an inner end of the baffle plate in the radial direction.
12. The magnetic geared electrical machine according to claim 1,
wherein the magnetic pole piece rotor further includes a pair of end plates respectively disposed on both sides of the plurality of magnetic pole pieces in the axial direction, and
wherein, among the pair of end plates, a first end plate located on the opposite side to the power transmission shaft has an opening communicating with the inner ventilation path on a radially inner side of an outer end of the baffle plate in the radial direction.
13. The magnetic geared electrical machine according to claim 1, further wherein:
the housing includes a wall surface defining a housing ventilation path communicating with an outlet of the fan; and
a restriction is disposed in the housing ventilation path.
14. The magnetic geared electrical machine according to claim 1, further wherein:
the housing includes at least one ventilation path extending in the axial direction on a radially outer side of the stator and forming a flow path for air flowing in the housing with rotation of the fan.
15. The magnetic geared electrical machine according to claim 14,
wherein the housing includes a plurality of outside-air paths respectively arranged alternately with a plurality of the ventilation paths in a circumferential direction based on the axial direction.
16. The magnetic geared electrical machine according to claim 1, further wherein:
the housing closes an internal space.

17. A power generation system, comprising:

the magnetic geared electrical machine according to claim 1, which serves as a magnetic geared generator configured to generate electric power upon input of rotational power; and the external device which serves as a prime mover including a shaft connected to the power transmission shaft configured such that rotational power is input thereto.

18. A drive system, comprising:

the magnetic geared electrical machine according to claim 1, which serves as a magnetic geared motor configured to output rotational power; and the external device which serves as a drive part including a shaft connected to the power transmission shaft configured to output rotational power.

\* \* \* \* \*